United States Patent
Kawabe

[11] Patent Number: 5,984,220
[45] Date of Patent: Nov. 16, 1999

[54] SPINNING REEL HAVING A NARROW REEL BODY HOUSING

[75] Inventor: Yuzo Kawabe, Izumi, Japan

[73] Assignee: Shimano Inc., Sakai, Japan

[21] Appl. No.: 08/958,256

[22] Filed: Oct. 27, 1997

[30] Foreign Application Priority Data

Oct. 30, 1996 [JP] Japan .................................. 7-288723

[51] Int. Cl.⁶ .................................................. A01K 89/01
[52] U.S. Cl. .......................................... 242/241; 242/311
[58] Field of Search .................................. 242/241, 242, 242/311

[56] References Cited

U.S. PATENT DOCUMENTS

| | | | |
|---|---|---|---|
| 2,314,616 | 3/1943 | Gaire . | |
| 3,296,731 | 1/1967 | Wood | 242/311 |
| 3,788,570 | 1/1974 | Yamazaki et al. | 242/311 |
| 4,512,531 | 4/1985 | Tunoda . | |
| 5,350,130 | 9/1994 | Hitomi et al. | 242/241 |
| 5,431,355 | 7/1995 | Takahashi | 242/246 |
| 5,443,571 | 8/1995 | Kang | 242/311 |
| 5,683,047 | 11/1997 | Ohtake | 242/311 |
| 5,788,173 | 8/1998 | Kawabe | 242/311 |

FOREIGN PATENT DOCUMENTS 1176814  6/1957  France .

*Primary Examiner*—Katherine A. Matecki
*Attorney, Agent, or Firm*—Shinjyu An Intellectual Property Firm

[57] ABSTRACT

To make a reel body compact, a fishing reel is mounted on a fishing rod with a cylindrical portion 30, and is provided with a rotatable rotor 3, a reel body 2, a spool shaft 20, a spool 4, a handle shaft 7, a pinion gear 14, and a oscilating mechanism 6. The reel body 2 has a rotor support portion 10c for rotatably supporting the rotor, and a flange portion 10d formed so as to cover a rear end portion of the cylindrical portion 30 outside the rotor support portion 10c. A housing of the reel body 2, has a lateral width rearward of the flange portion 10d that is in the range of 20 to 60% of a diameter of the flange portion 10d. The spool shaft 20 is reciprocatingly rotatably supported for back and forth movement within the housing of the reel body 2. The spool 4 is fixed to an end of the spool shaft 20 such that the fishing line may be guided by a fishing line guiding portion and wound around an outer circumference of the spool. A oscilating mechanism 6 includes a screw shaft 21 disposed above and generally parallel with the spool shaft 20 within the housing.

9 Claims, 6 Drawing Sheets

SPINNING REEL HAVING A NARROW REEL BODY HOUSING

BACKGROUND OF THE INVENTION

1. Field of the Invention

The present invention relates to a fishing reel, and more particularly to a fishing reel mounted on a fishing rod for winding a fishing line around a spool by using a rotor that rotates synchronized with a rotation of a handle.

2. Description of the Related Art

In general, a fishing reel has a reel body, a rotor that is rotatably mounted on the reel body, and a spool around which a fishing line is to be wound and which is located in a front side of the rotor. The reel body has a rotor support portion for rotatably supporting the rotor, and a flange portion formed outside the rotor support portion so as to cover a rear end portion of a cylindrical portion. The rotor has the cylindrical portion having a front wall and a pair of arm portions that are formed to oppose each other at sides of the cylindrical portion. A line guide portion that may be pivoted to a line discharge position and closed to a line winding position, is provided between the pair of arm portions. The line guide portion has bail support members pivotally supported on the pair of arm portions, respectively, a line roller rotatably supported at a tip end of one of the bail support members, and a bail for connecting the pair of bail support members.

Furthermore, a oscilating mechanism for winding a fishing line, guided by the bail and the line roller, around an outer periphery of the spool uniformly back and forth is provided for the fishing reel. The oscilating mechanisms are classified generally into ones having an oscillating gear and others having a screw shaft along the spool shaft. In the oscillating gear type oscilating mechanism, a winding density is different between opposite end portions and a central portion of the spool. Often, the winding density at the central portion being low is such that the windings of the fishing line in the central portion form a recess or depression with the windings on the axial ends of the spool being thicker than the central portion. For this reason, the screw shaft type oscilating mechanism that may uniformly wind the fishing line around the spool has recently been used in many cases.

The screw shaft type oscilating mechanism is provided with a screw shaft arranged in parallel with the spool shaft, an intermediate gear for rotating the screw shaft and a slider for sliding moving the screw shaft. The screw shaft is disposed along the spool shaft on, for example, an oblique side of the spool shaft. A crossing spiral groove is formed in an outer circumference of the screw shaft. A part of a slider is engaged with the spiral groove. The intermediate gear is fixed to a tip end of the screw shaft and is to be rotated in synchronized with the handle. The slider is fixed to the rear end of the spool shaft substantially at the same position in the axial direction as that of the engagement portion with the screw shaft. The slider is reciprocatingly moved along the screw shaft so that the spool shaft and the spool are reciprocatingly moved in the same manner. Thus, the spool is reciprocated in accordance with the rotational operation of the handle so that the fishing line is uniformly wound around the outer circumference of the spool.

In such a fishing reel, it is important to make the structure compact in size and light in weight for the purpose of easy casting. However, in the structure having the screw shaft type oscilating mechanism as in the conventional fishing reel, since the screw shaft is located on the oblique side of the spool shaft, a right and left dimension (transverse width) of the reel body is increased, and is usually 50% or more of a diameter of the flange portion. For this reason, it is difficult to make the reel body compact.

SUMMARY OF THE INVENTION

An object of the present invention is to provide a reel body that may be made compact.

In accordance with one aspect of the present invention, a fishing reel is mountable on a fishing rod and includes a rotatable rotor formed with a cylindrical portion. The cylindrical portion is formed with a front wall and arm portions provided on opposite sides of the cylindrical portion. A fishing line guiding portion is pivotally mounted at one end of one of the arm portions. A reel body is formed with a housing and a rotor support portion for rotatably supporting the rotor, and a flange extending from a portion of the rotor support portion. The flange is formed so as to cover a rear end portion of the cylindrical portion of the rotor. The housing is formed rearward of the flange and a width that is about 20 to 60% of a diameter of the flange. A spool shaft is reciprocatingly rotatably supported within the reel body. A spool is fixed to an end of the spool shaft such that a fishing line guided by the fishing line guiding portion is woundable around an outer circumference of the spool, A rotatable handle shaft is arranged in the reel body in a direction perpendicular to the spool shaft. The handle shaft has a handle and a master gear mounted thereon. A pinion gear is arranged so as to engage the master gear on an outer circumferential side of the spool shaft and connected to the rotor. A reciprocating mechanism is disposed in the housing for reciprocating the spool shaft. The reciprocating mechanism includes a spiral shaft arranged along the spool shaft in the reel body and has a spiral groove on its outer circumference, an intermediate gear mounted unrotatably to the spiral shaft and meshing with the pinion gear, an engagement member engaging with the spiral groove, and a sliding member that is fixed in an axial direction relative to the spool shaft and that reciprocates together with the spool shaft upon rotation of the spiral shaft.

Preferably, the spiral shaft is located in generally the same plane and generally parallel to the spool shaft within the housing.

Preferably, the handle is provided at a tip end of the handle shaft, the master gear is provided at a proximal end of the handle shaft, and the handle shaft is supported rotatably on the reel body at an intermediate portion thereof.

Preferably, the spiral shaft and the spool shaft are disposed generally within the same plane within the housing, the plane being generally parallel to the master gear.

Preferably, the plane is generally perpendicular to a direction corresponding to the width of the housing.

In the fishing reel of the present invention, when the handle is rotated, the handle shaft is rotated so that the master gear is rotated. The pinion gear that is engaged with the master gear is rotated to thereby rotate the rotor. When the pinion gear is rotated, the intermediate gear that meshes with the pinion gear is also rotated. When the intermediate gear is rotated, the screw shaft arranged along the spool shaft is rotated and the sliding member that engages with the screw shaft is reciprocated back and forth to thereby reciprocate the spool and the spool shaft. Thus, the fishing line that has been guided to the fishing line guiding portion of the rotor is uniformly wound back and forth around the spool.

It should herein be noted that since the lateral width, rearward of the flange portion, of the reel body is in the range of 20 to 60% of the flange portion, the lateral width of the reel body becomes short and the size of reel body may be reduced.

3

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

Overall Structure and Structure of Reel Body

Figure 1:
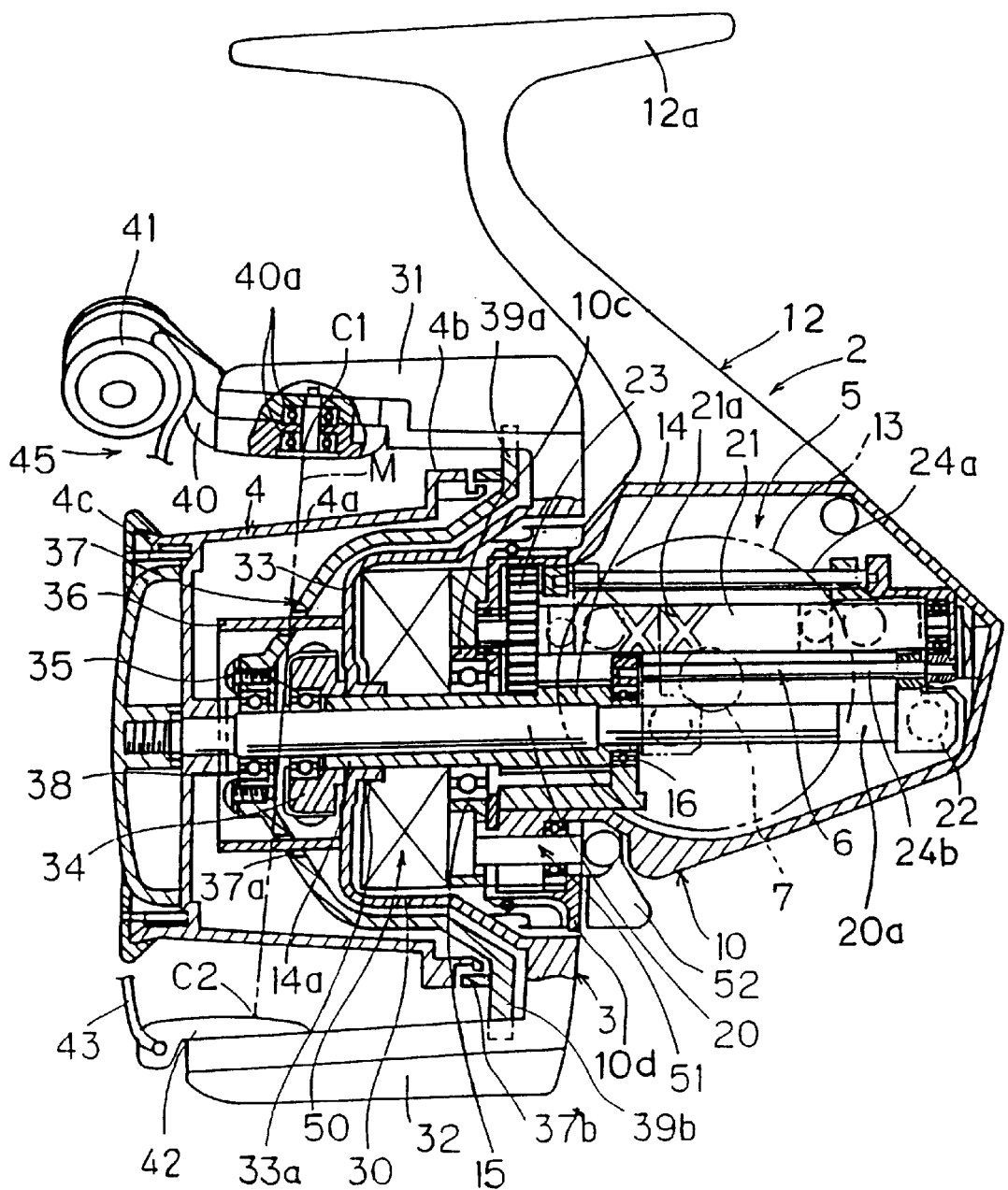
FIG. 1 is a part cross-sectional, part elevational side view showing a fishing reel in accordance with one embodiment of the present invention.
Figure 2:
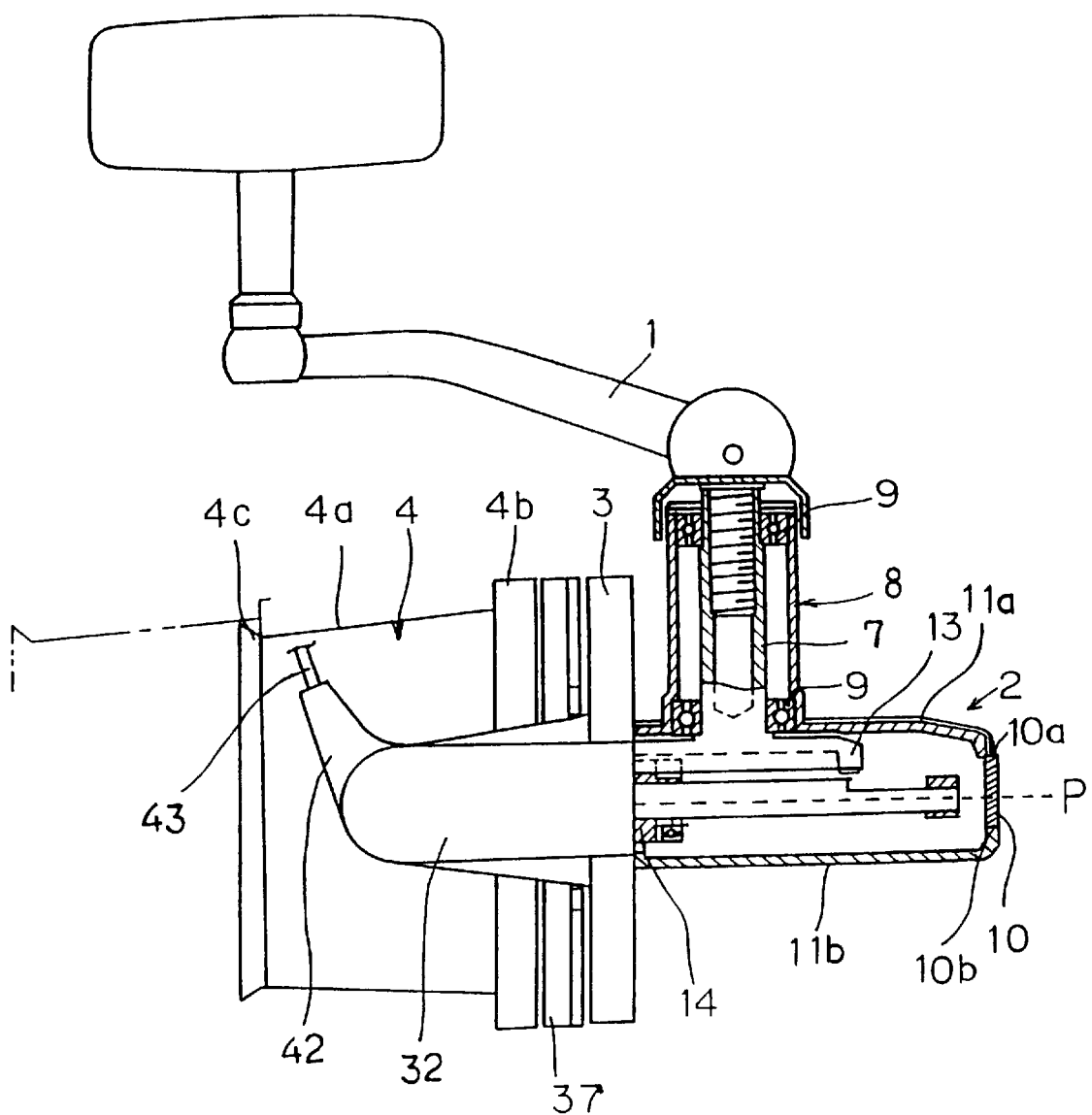
FIG. 2 is a part cross-sectional, part elevational bottom view of the fishing reel depicted in FIG. 1.
Figure 3:
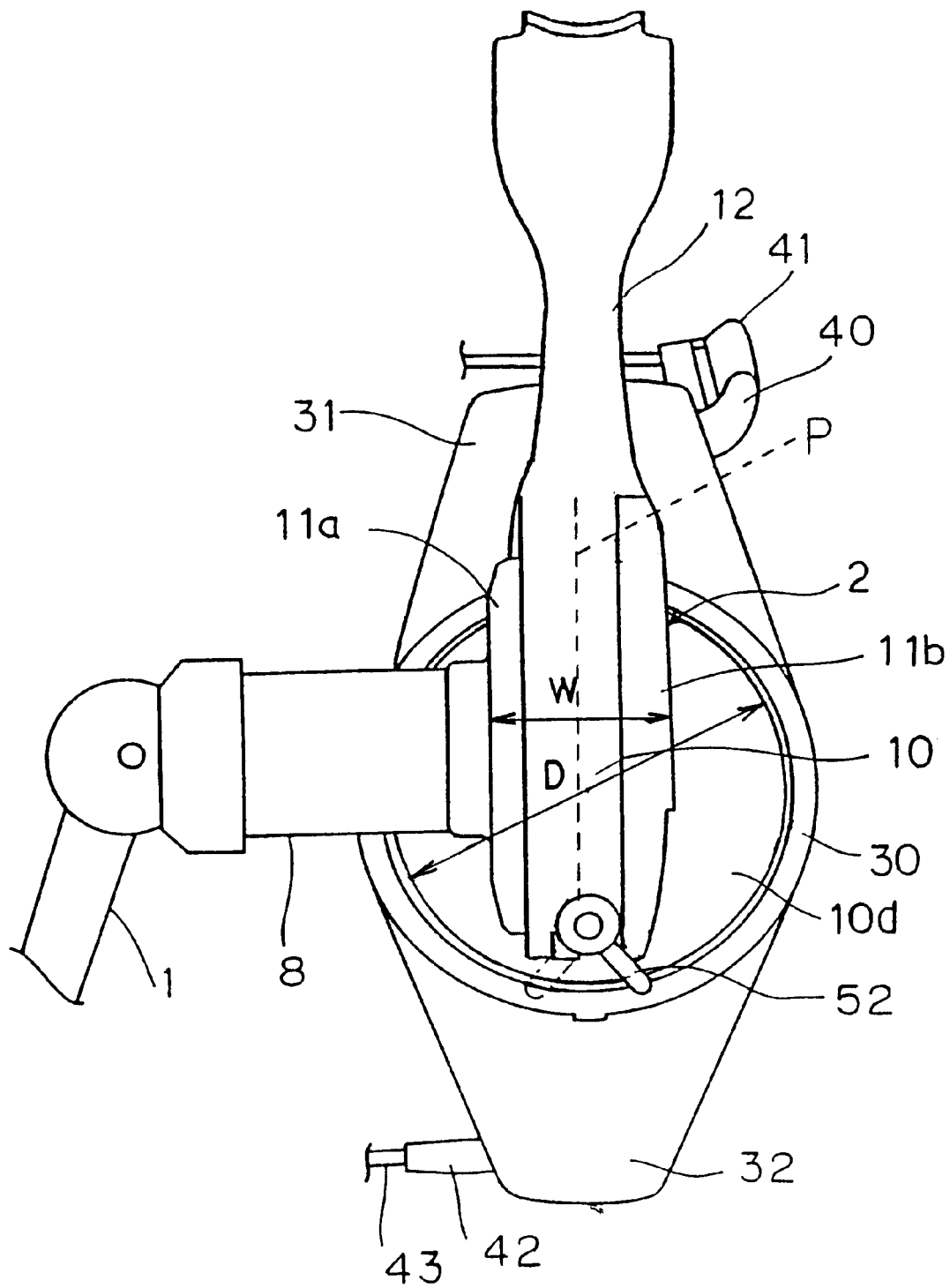
FIG. 3 is an elevational rear view of the fishing reel depicted in FIGS. 1 and 2.

In FIGS. 1 to 3, a fishing reel according to one embodiment of the present invention is provided with a reel body 2 for rotatably supporting a handle 1, a rotor 3, and a spool 4. The rotor 3 is rotatably supported on a front portion of the reel body 2. The spool 4 in configured to wind a fishing line around an outer circumferential surface thereof, and is movable in an axial direction on a front portion of the rotor 3.

The reel body 2 is formed with a housing 10 which supports the rotor 3 and the spool 4. A pair of covers 11a and 11b detachably screw fasten to each side surface of the housing 10, respectively. A fishing rod mounting portion 12 extends upwardly from the housing 10. The housing 10 is, for example, a thin member made of aluminum alloy and has openings 10a and 10b formed on opposite sides of the housing 10, as is shown in FIG. 2. The cover 11a covers the opening 10a and the cover 11b covers the opening 10b. The housing 10 also has a rotor support portion 10c for rotatably supporting the rotor 3 at a front end thereof, and a circular flange portion 10d shown in FIGS. 1 and 3. The circular flange portion 10d is formed with a generally circular shape which corresponds to a rear end open portion of a cylindrical portion 30 (described below) of the rotor 3.

The flange portion 10d covers an open space of the cylindrical portion 30 for the purpose of preventing foreign matters such as dusts or the like from entering the interior. A slight gap is defined between the flange portion 10d and the rear end portion of the cylindrical portion 30 as best shown in FIG. 3. A lateral width W is measured from the outer side of the covers 11a and 11b of the flange portion 10d of the reel body 2. The lateral width W is in the range of 20 to 60% of a diameter D of the flange portion 10d.

In the interior of the housing 10, there are provided a rotor drive mechanism 5 for rotating the rotor 3 and a oscilating mechanism 6 for moving the spool 4 back and forth and uniformly winding the fishing line.

The covers 11a and 11b are, for example, thin members made of aluminum alloy and are used to cover the opening portions 10a and 10b of the housing 10, respectively. Disposed on the cover 11a (the upper side in FIG. 2) is a cylindrical handle support portion 8 projecting on one side

4 for supporting a handle shaft 7 to which the handle 1 is fixed at one end. Bearings 9 are arranged at both ends of the handle support portion 8. The handle shaft 7 is rotatably supported to the handle support portion 8 by the bearings 9.

The fishing rod mounting portion 12 is a member extending obliquely upwardly, in a forward direction from the housing 10, as shown from the side in FIG. 1, and is formed with a T-shaped that is integral with the housing 10. A fishing rod mounting surface 12a is formed on an upper portion of the fishing rod mounting portion 12.

The rotor drive mechanism 5 has a master gear 13 (FIG. 2) formed integrally with the handle shaft 7 at a proximal end of the handle shaft 7, and a pinion gear 14 that meshes with the master gear 13. The pinion gear 14 is formed into a cylindrical sleeve with its front portion 14a extending through the central portion of the rotor 3 and into the interior of the spool 4. The intermediate portion and the rear end portion, in the axial direction, of the pinion gear 14 are rotatably supported to the housing 10 of the reel body 2 through bearings 15 and 16, respectively.

The oscilating mechanism 6 is a mechanism for reciprocatingly moving in the axial direction a spool shaft 20 having an end to which the central portion of the spool 4 is fixed, for moving the spool 4 in the same direction. The oscilating mechanism 6 includes a screw shaft 21 disposed above the spool shaft 20, a slider 22 moving in the axial direction along the screw shaft 21, and an intermediate gear 23 fixed at a tip end of the screw shaft 21. The screw shaft 21 is arranged in parallel with the spool shaft 20 with its end portion being rotatably supported to the housing 10 within the interior of the rotor 3. A spiral groove 21a is formed in an outer circumferential potion of the screw shaft 21. A rear end of the spool shaft 20 is fixed to the slider 22. The intermediate gear 23 is fixed to a front end portion of the screw shaft 21 and is engaged with the pinion gear 14.

The spool shaft 20 and the screw shaft 21 being parallel, define a plane P indicated in FIGS. 2 and 3. The plane P is perpendicular to the image shown in FIGS. 2 and 3 and therefore the plane P is shown as a line. The plane P is generally parallel to the master gear 13. Further, the plane P is generally perpendicular to the measured width W of the housing 10.

Slider Structure

Figure 4:
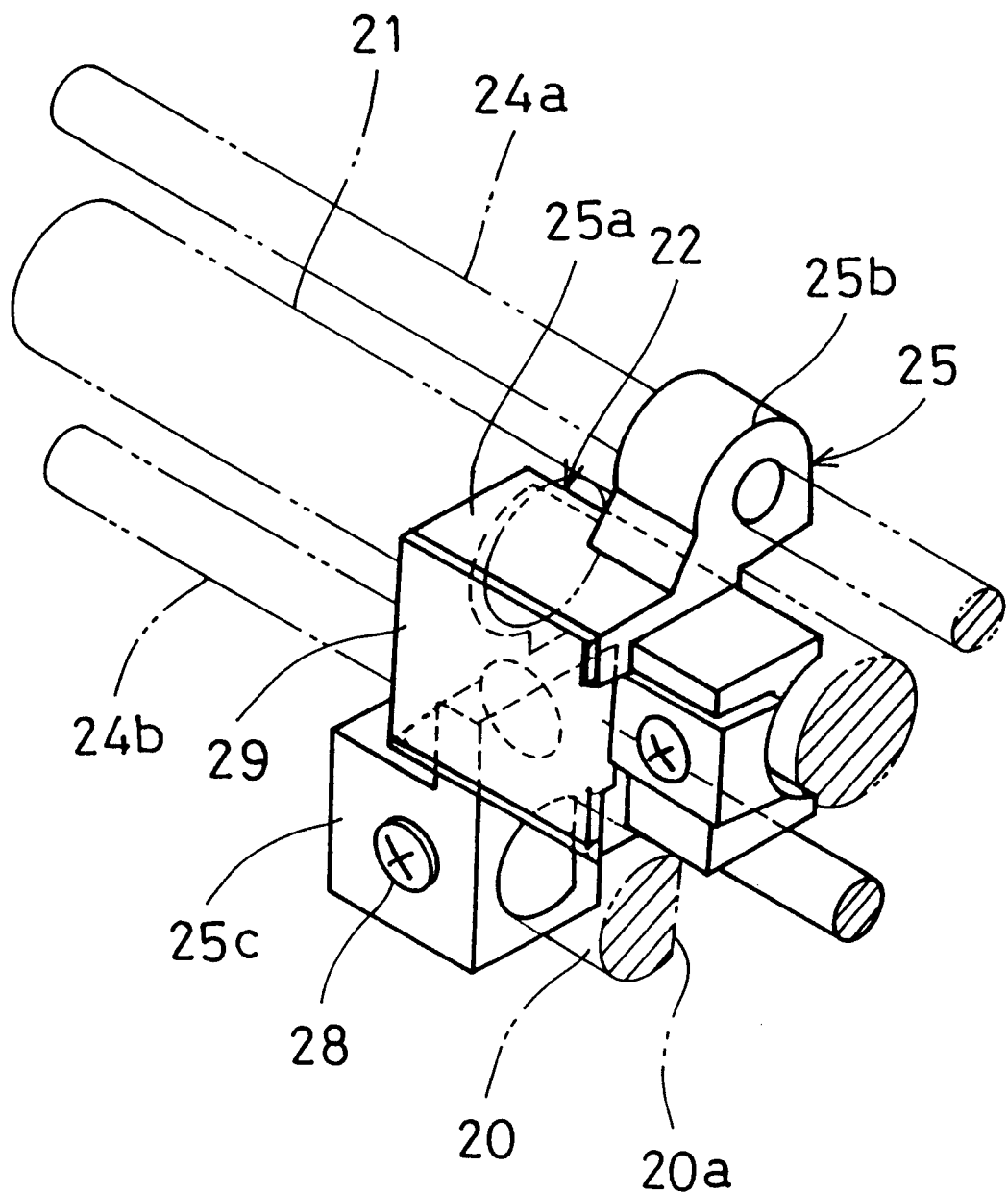
FIG. 4 is a fragmentary perspective view of a slider of the fishing reel depicted in FIGS. 1, 2 and 4.
Figure 5:
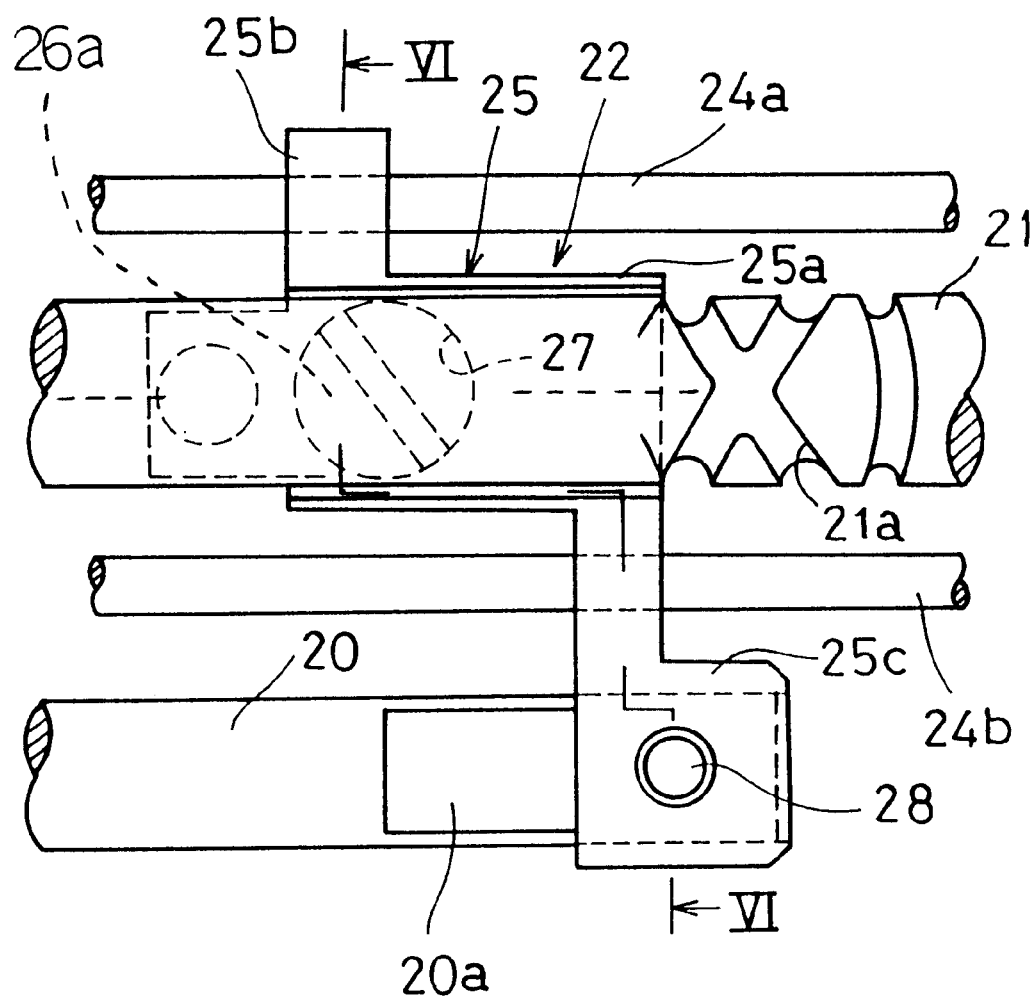
FIG. 5 is a fragmentary side elevational view of the slider depicted in FIG. 4.
Figure 6:
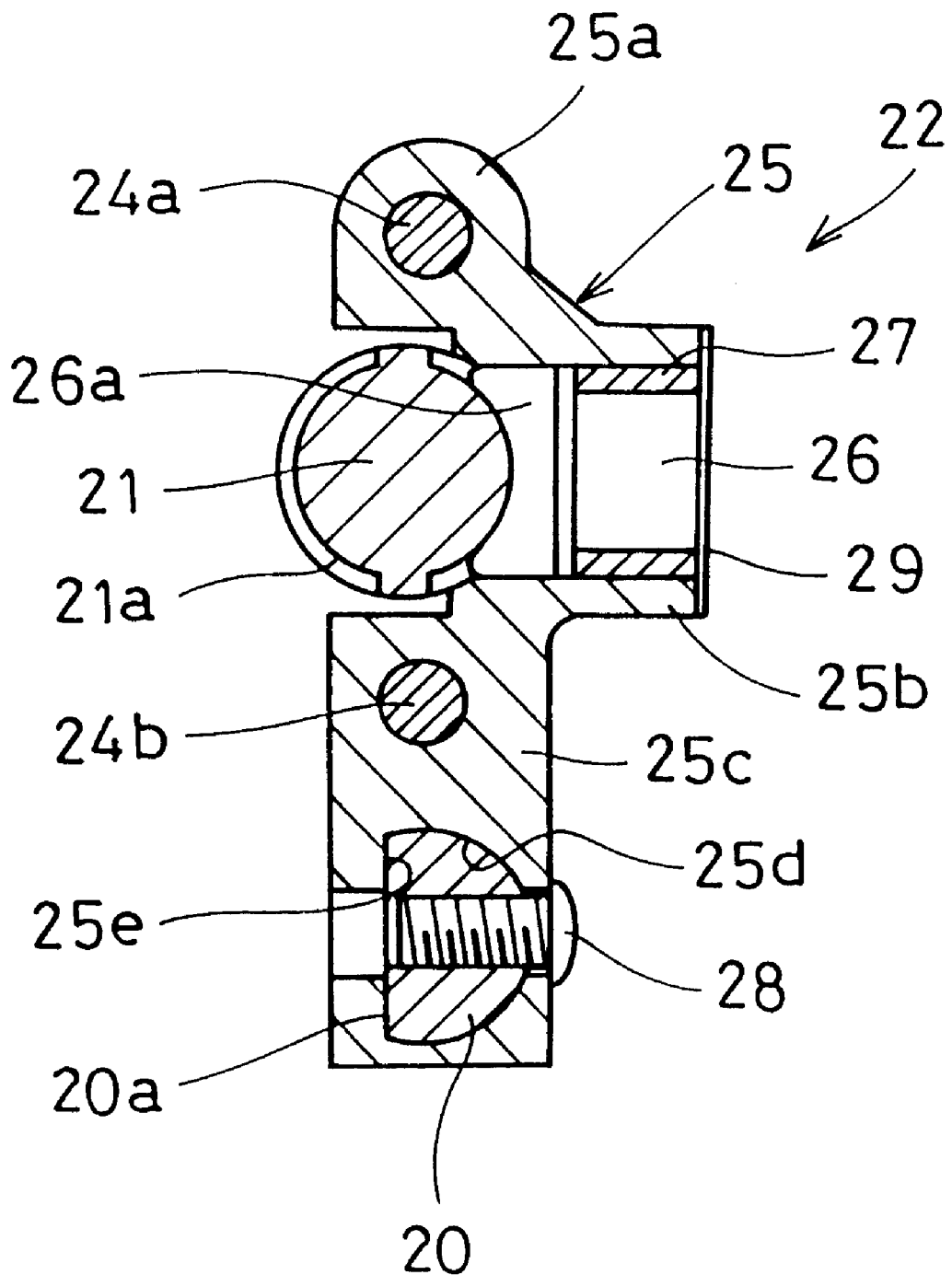
FIG. 6 is a cross-sectional view of a portion of the slider taken along the line VI—VI in FIG. 5.

As shown in FIGS. 4 to 6, the slider 22 has a slider body 25 and an engagement member 26 received in the slider body 25. The slider body 25 has a body portion 25a disposed along side the screw shaft 21, as shown in FIG. 5, a guide portion 25b extending from a front portion (on the upper left side of FIG. 5) of the body portion 25a, and a fixture portion 25c extending from a rear side (on the lower right side of FIG. 5) of the body portion 25a. A lateral or transverse hole 27 is formed so as to intersect the screw shaft 21, as shown in FIG. 6. The engagement member 26 is rotatably inserted into this hole 27. The guide portion 25b is slidably mounted on a guide shaft 24a arranged in parallel with and above the screw shaft 21.

The fixture portion 25c is slidably mounted on a guide shaft 24b arranged in parallel with and below the screw portion 21, and at the same time is fixed in the axial direction by a screw 28 relative to the spool shaft 20 arranged below the guide shaft 24b. Incidentally, a cutout 20a is formed in the portion of the spool shaft 20 that engages with the fixture portion 25c. The cutout 20a is generally flat, as is shown from the rear end thereof in FIG. 6. An associated hole 25d of the fixture portion 25c has a partially circular shape in cross-section and has a flat portion 25e corresponding to the cutout 20a. With such an engagement, the slider body 25 is prevented from rotating relative to the spool shaft 20.

Formed at the tip end of the engagement member 26 is the engagement portion 26a engaged with the grooves 21a of the screw shaft 21. A cover member 29 is fixed to a proximal end of a hole 27 of the body portion 25a for preventing the engagement member 26 from being pulled out from the hole 27. Also, a stop (not shown) is provided at a distal end of the hole 27 for limiting the movement of the engagement member 26 on the distal end side.

Rotor Structure

Referring back to FIG. 1, the rotor 3 has the cylindrical portion 30, a first rotor arm 31 and a second rotor arm 32 that are provided to face one another on opposite sides of the cylindrical portion 30. The cylindrical portion 30 and the two rotor arms 31 and 32 are formed integrally with each other.

A front wall 33 is formed in the front portion of the cylindrical portion 30, and a boss 33a is formed in the central portion of the front wall 33. The front portion 14a of the pinion gear 14 and the spool shaft 20 extend through a through-hole of the boss 33a. The rear end portion of the cylindrical portion 30 is covered by the flange portion 10d of the reel body 2 as described above. A nut 34 is disposed on the front side of the front wall 33. This nut 34 engages with the screw portion at the tip end of the pinion gear 14. A bearing 35 is disposed on the inner circumferential portion of the nut 34 for rotatably supporting the nut 34 relative to the spool shaft 20.

A first line tangle preventing member 36 is formed in the front wall 33 of the rotor 3 and has a cylindrical shape. The first line tangle preventing member 36 is formed with a pair of slits extending in the axial direction. The first line tangle preventing member 36 is a member for preventing the fishing line, as it is wound around the spool 4, from entering through a gap between the rotor 3 and the spool 4 and getting tangled around on the spool shaft 20. A second fishing line tangle preventing member 37 is provided on the interior of the spool 4 between the spool 4 and the rotor 3 for preventing the fishing line as it is wound around the spool 4 from entering through a gap between the rotor 3 and the spool 4 and getting tangled around on the spool shaft 20. The second fishing line tangle preventing member 37 is a member formed with a cup-shape.

The second fishing line tangle preventing member 37 is formed with a pair of arcuate through-holes 37a through which the first fishing line preventing member 36 extends. A bearing 38 for rotatably supporting the spool shaft 20 is disposed at the central portion of the second fishing line preventing member 37. Provided at the circumferential edge portion of the second fishing line tangle preventing member 37 are a cylindrical portion 37b for obstructing a gap between the rear end portion of the spool 4 and the rotor 3. Further, a pair of rotor retaining portions 39a and 39b extend radially outwardly from the cylindrical portion 37b. The rotor retaining portions 39a and 39b engage portions of the pair of rotor arms 31 and 32 of the rotor 3 to rotate the second fishing line tangle preventing member 37 in synchronized with the rotor 3.

A first bail support member 40 is pivotally mounted on an inner circumferential portion of an end of the first rotor arm 31. The first bail support member 40 is rotatably supported on the first rotary arm 31 by two bearings 40a. A line roller 41 is mounted at an end of the first bail support member 40 for guiding the fishing line onto the spool 4. A second bail support member 42 is pivotally mounted on an inner circumferential portion of an end of the second rotor arm 32. It is possible to function the second bail support member 42 as a weight balancer, for example, by making the second bail support member 42 of material having a greater specific weight than that of the other parts for eliminating an unbalance upon rotation caused by the first bail support member 40 and the line roller 41. A bail 43 is provided which extends between the line roller 41 at the end of the first bail support member 40 and the second bail support member 42. A bail arm 45 is constituted by the bail support members 40 and 42, the line roller 41 and the bail 43. Thus, each bail support member 40, 42 is mounted on the inner circumferential side of the rotor arms 31 and 32 so that the rotational radius of the bail arm 45 is decreased and the bail arm 45 hardly hits the fisherman's hand gripping the fishing rod. Accordingly, the fishing rod mounting portion 12 is shortened, and it is possible to make the spool 4 and the fishing rod close to each other making the overall structure more compact than prior art configurations.

It should herein be noted that the two bail support members 40 and 42 may be pivotally mounted about a single swing axis M, shown in FIG. 1. A point at which the swing axis M and the first bail support member mounting surface of the first rotor arm 31 intersect with each other is referred to as a swing center C1, and a point at which the swing axis M and the second bail support member mounting surface of the first rotor arm 32 intersect with each other is referred to as a swing center C2, the swing center C2 is located forward of the swing center C1, where a forward direction is defined as being the left side of FIG. 1. Namely, the swing axis M is slanted rearwardly relative to an axis perpendicular to the spool shaft 20. Also, each of the bail support members 40 and 42 is arranged so that its pivoting surface is perpendicular to the swing axis M.

A reverse rotation preventing mechanism 50 is provided in the interior of the cylindrical portion 30 of the rotor 3. The reverse rotation preventing mechanism 50 has a roller type one-way clutch (not shown) and an operating mechanism 51 for switching over the one-way clutch between the operative condition and the inoperative condition (allowing rotation is both directions). An outer race of the one-way clutch is fixed to the housing 10, and an inner race thereof is fixed to the pinion gear 14. The operating mechanism 51 has an operating lever 52 located in the lower portion of the housing 10. The operating lever 52 may be swung to thereby perform the switch-over from one-way clutch operation and allowing rotation in both directions. In the operative condition, the rotor 3 is prevented from rotating reversely, and in the inoperative condition the rotor 3 may rotate in the reverse direction.

Spool Structure

The spool 4 is disposed between the first rotor arm 31 of the rotor 3 and the second rotor arm 32 thereof and is fixed to the end of the spool shaft 20. The spool 4 has a fishing line winding drum portion 4a around which the fishing line is to be wound, a rear flange portion 4b formed integrally with the rear portion of the fishing line winding drum portion 4a, and a front flange portion 4c fixed to the front portion of the fishing line winding drum portion 4a. The fishing line winding drum portion 4a extends up to the outer circumferential side of the cylindrical portion 30 of the rotor 3, with its drum length extending more than that of a prior art fishing reel. A height or diameter of the flange portion 4b and a height or diameter of the flange portion 4c are smaller than that of the prior art fishing reel. Thus, a resistance upon the release of the fishing line becomes low, and even if a thin fishing line is wound around the fishing line winding drum portion 4a, the fishing line is less likely to become twisted.

Reel Operation

In the foregoing fishing reel, upon casting, the bail 43 is manually pivoted so that it moves to a line release side of the spool 4 from a line winding side thereof. Thus, the first and second bail support members 40 and 42 are pivoted in the same direction about the swing axis M. At this time, the first and second bail support members 40 and 42 are arranged inside of the first and second rotor arms 31 and 32 and at the same time the swing axis M is slanted rearwardly relative to the spool shaft 20 so that the first bail support member 40 and the line roller 41 at its end are moved more inwardly than when in the line winding position. For this reason, the fishing line which has been reeling out upon casting would be less likely to become entangled around the first bail support member 40 or the line roller 41.

Upon winding the fishing line in, the bail 43 is pivoted to the line winding position. This is automatically effected by the action of a cam and a spring (not shown) when the handle 1 is rotated in the fishing line winding direction. When the handle 1 is rotated in the fishing line winding direction, its rotational torque is transmitted to the pinion gear 14 through the handle shaft 12 and the master gear 13. The rotational torque that has been transmitted to the pinion gear 14 is further transmitted to the rotor 3 through the front portion of the pinion gear 14 to thereby rotate the rotor 3 in the fishing line winding direction.

On the other hand, the screw shaft 21 is rotated by the intermediate gear 23 that meshes with the pinion gear 14, so that the slider 22 engaging with the spiral groove 21a of the screw shaft 21 is moved back and forth while being guided by the guide shafts 24a and 24b. For this reason, the spool shaft 20 and the spool 4 are reciprocatingly moved back and forth in the axial direction. The fishing line that is guided to the spool 4 by the bail 43 and the line roller 41 is substantially uniformly wound back and forth in the axial direction around an outer circumferential surface of the line winding drum portion 4a of the spool 4.

In the fishing reel having such a structure, since the slider 22 is reciprocatingly moved by the guidance of the two guide shafts 24a and 24b, the slider 22 is smoothly reciprocated without any rotational displacement or tilt. For this reason, it is unnecessary to cover the full circumference of the screw shaft 21 by the slider body 25, so that it is possible to make small the space opposite to the engagement member 26. As a result, it is possible to reduce the projection in the lateral direction in the rear portion of the reel body 2 to thereby make the reel body 2 compact.

Also, since the screw shaft 21 is located above the spool shaft 20, the lateral width W of the portion, rearward of the flange portion 10d, of the reel body 2 is narrowed down to 20 to 60% of the diameter D of the flange portion 10d, and the projection in the lateral direction may be further decreased. At the same time, since the one end of the screw shaft 21 to which the intermediate gear 23 is fixed is located in the interior of the rotor 3, the rear end of the screw shaft 21 is located more forwardly than the conventional structure. Thus, the axial length of the reel body 2 may be shortened. For this reason, it is possible to significantly reduce the overall width in comparison with the conventional screw shaft type fishing reel as mentioned above. It is possible to make the reel body 2 further compact.

Furthermore, in the slider body 25, since the fixture portion with the spool shaft 20 is located rearwardly of the engagement portion with the screw shaft 21, even if the one end of the screw shaft 21 is located in the interior of the rotor 3, it is possible to make the structure so that the spool shaft fixture portion of the slider 22 that has been forwarded could not interfere with the pinion gear 14.

Also, since the handle shaft 7 is supported only to the cover member 11a, it is unnecessary to provide the handle shaft 7 penetrating fully through the reel body 2. For this reason, it is possible to easily arrange the screw shaft 21 above and close to the spool shaft 20, whereby it is possible to shorten the vertical length (height) of the reel body 2. Furthermore, it is possible to make the reel body 2 compact. Also, the mounting precision for the handle shaft is enhanced and the rotation of the handle is smooth.

Other Embodiments (a) The embodiments of the fishing reel should not be limited to the above-described specific embodiment. It is possible to apply the present invention to ones having a drag mechanism in a front or a rear portion, or ones having a braking mechanism with a brake lever instead of the reverse rotation preventing mechanism.

(b) The structure of the slider and the like of the oscilating mechanism should not be limited to that shown in the foregoing embodiment.

Advantages of the Invention

In the fishing reel according to the present invention, since the lateral width, rearward of the flange portion, of the reel body is in the range of 20 to 60% of the diameter of the flange portion, the lateral width of the reel body is short and the reel body may be miniaturized.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A fishing reel mountable on a fishing rod, comprising:
a rotatable rotor having a cylindrical portion, said cylindrical portion having a front wall, said rotor further including arm portions provided on opposite sides of said cylindrical portion, and a fishing line guiding portion pivotally mounted at one end of one of said arm portions;
a reel body having a housing and a rotor support portion for rotatably supporting said rotor, and a flange extending from a portion of said rotor support portion, said flange covering a rear end portion of said cylindrical portion of said rotor, said housing extending rearward of said flange, said housing having a width that is about 20 to 60% of a diameter of said flange;
a spool shaft reciprocatingly and rotatably supported within said reel body;
a spool fixed to an end of said spool shaft such that a fishing line guided by said fishing line guiding portion is windable around an outer circumference of said spool;
a rotatable handle shaft arranged in said reel body in a direction perpendicular to said spool shaft, said handle shaft having a handle and a master gear mounted thereon;
a pinion gear arranged so as to engage with said master gear on an outer circumferential side of said spool shaft and connected to said rotor; and
a reciprocating mechanism disposed in said housing for reciprocating said spool shaft, said reciprocating mechanism including a spiral shaft arranged along said spool shaft in said reel body and having a spiral groove on its outer circumference, an intermediate gear mounted unrotatably to said spiral shaft and meshing with said pinion gear, two generally parallel guide shafts fixed within said housing parallel to said spool shaft and on opposite sides of said spiral shaft, a slider member that is fixed in an axial direction relative to said spool shaft and that reciprocates together with said spool shaft upon rotation of said spiral shaft, said slider member being slidable on said guide shafts, and an engagement member supported in said slider member, a portion of said engagement member being engaged in said spiral groove, said slider member comprising a slider body that extends between said guide shafts, said slider body defining a notch therebetween, said spiral shaft extending into said notch such that portions of said slider body proximate said guide shafts are spaced apart from said spiral shaft.

2. The fishing reel according to claim 1, wherein said spiral shaft is located in generally the same plane and generally parallel to said spool shaft within said housing.

3. The fishing reel according to claim 1, wherein said handle is provided at a tip end of said handle shaft, said master gear is provided at a proximal end of said handle shaft, and said handle shaft is supported rotatably on said reel body at an intermediate portion thereof.

4. The fishing reel according to claim 1, wherein spiral shaft and said spool shaft are disposed generally within the same plane within said housing, said plane being generally parallel to said master gear.

5. The fishing reel according to claim 4, wherein said plane is generally perpendicular to a direction corresponding to said width of said housing.

6. The fishing reel according to claim 1, wherein said slider body further comprises a fixture portion that engages said spool shaft beneath a lower one of said guide shafts.

7. The fishing reel according to claim 6, wherein said slider body further comprises a guide portion having an aperture formed therein through which an upper one of said guide shafts extends, a lower surface of said guide portion at least partially defining said notch.

8. The fishing reel according to claim 7, wherein said fixture portion is formed with an aperture through which said lower one of said guide shafts extends and an upper surface of said fixture portion at least partially defines said notch.

9. The fishing reel according to claim 8, wherein said spiral shaft is located in generally the same plane and generally parallel to said spool shaft within said housing.

* * * * *